(12) United States Patent
Barsness et al.

(10) Patent No.: US 10,079,809 B2
(45) Date of Patent: *Sep. 18, 2018

(54) MOVING A PORTION OF A STREAMING APPLICATION TO A PUBLIC CLOUD BASED ON SENSITIVE DATA

(71) Applicant: International Business Machines Corporation, Armonk, NY (US)

(72) Inventors: Eric L. Barsness, Pine Island, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 210 days.

This patent is subject to a terminal disclaimer.

(21) Appl. No.: 15/051,474

(22) Filed: Feb. 23, 2016

(65) Prior Publication Data

US 2017/0078446 A1    Mar. 16, 2017

Related U.S. Application Data

(63) Continuation of application No. 14/850,236, filed on Sep. 10, 2015, now Pat. No. 9,699,148.

(51) Int. Cl.
*H04L 29/06* (2006.01)
*G06F 21/62* (2013.01)
(Continued)

(52) U.S. Cl.
CPC ...... *H04L 63/0428* (2013.01); *G06F 9/45558* (2013.01); *G06F 9/50* (2013.01);
(Continued)

(58) Field of Classification Search
CPC . H04L 63/0428; H04L 67/10; H04L 67/1095; H04L 65/4069; G06F 21/6245; G06F 2009/4557; G06F 2009/45562
(Continued)

(56) References Cited

U.S. PATENT DOCUMENTS 7,222,317 B1    5/2007    Mathur et al.
8,011,003 B2    8/2011    Rowney et al.
(Continued)

OTHER PUBLICATIONS

Patidar et al., "A Survey Paper on Cloud Computing", 2012 2nd Int'l Conf. on Advanced Computing & Comm. Tech., p. 394-398, 2012.
(Continued)

*Primary Examiner* — Syed Zaidi
(74) *Attorney, Agent, or Firm* — Martin & Associates, LLC; Derek P. Martin

(57) ABSTRACT

A streams manager determines which portions of a streaming application process sensitive data, and when performance of the streaming application needs to be increased, selects based on the sensitive data which portion(s) of the streaming application can be moved to a public cloud. The streams manager then interacts with the public cloud manager to move the selected portion(s) of the streaming application to the public cloud. This may include cloning of processing elements or operators to a public cloud, then splitting tuple attributes so tuple attributes that do not include sensitive data can be processed in the public cloud while tuple attributes that include sensitive data are processed in a secure system. The tuple attributes are then recombined into full tuples in the secure system. The streams manager thus protects the integrity of sensitive data while still taking advantage of the additional resources available in a public cloud.

8 Claims, 12 Drawing Sheets

(51) Int. Cl.
*H04L 12/26* (2006.01)
*H04L 29/08* (2006.01)
*H04L 12/24* (2006.01)
*G06F 9/455* (2018.01)
*G06F 9/50* (2006.01)

(52) U.S. Cl.
CPC ...... *G06F 21/6245* (2013.01); *H04L 41/5025* (2013.01); *H04L 41/5054* (2013.01); *H04L 43/04* (2013.01); *H04L 67/36* (2013.01); *G06F 2009/45562* (2013.01); *H04L 41/509* (2013.01)

(58) Field of Classification Search
USPC .......................................................... 726/28
See application file for complete search history.

(56) References Cited

U.S. PATENT DOCUMENTS

| | | | |
|---|---|---|---|
| 8,037,187 B2 | 10/2011 | Dawson et al. | |
| 8,417,938 B1 | 4/2013 | Considine et al. | |
| 8,468,455 B2 | 6/2013 | Jorgensen et al. | |
| 8,635,334 B2 | 1/2014 | Malloy et al. | |
| 8,732,300 B2 | 5/2014 | Barsness et al. | |
| 9,059,973 B2 | 6/2015 | Anantharam et al. | |
| 9,088,549 B2 | 7/2015 | Anantharam et al. | |
| 9,167,050 B2 | 10/2015 | Durazzo et al. | |
| 2004/0034807 A1 | 2/2004 | Rostowfske | |
| 2005/0119976 A1 | 6/2005 | Taylor et al. | |
| 2008/0159141 A1 | 7/2008 | Soukup et al. | |
| 2009/0172095 A1 | 7/2009 | Moore et al. | |
| 2009/0319687 A1 | 12/2009 | Goldstein et al. | |
| 2010/0265941 A1* | 10/2010 | Foxworthy ........ | H04B 7/18595 370/389 |
| 2010/0333116 A1 | 12/2010 | Prahlad et al. | |
| 2011/0314019 A1* | 12/2011 | Jimenez Peris ....... | G06F 9/5066 707/737 |
| 2012/0005724 A1 | 1/2012 | Lee | |
| 2012/0072992 A1 | 3/2012 | Arasaratnam et al. | |
| 2012/0204187 A1 | 8/2012 | Breiter et al. | |
| 2012/0251007 A1 | 10/2012 | Yang et al. | |
| 2013/0042106 A1 | 2/2013 | Persaud et al. | |
| 2013/0054779 A1 | 2/2013 | Cradick et al. | |
| 2013/0204849 A1 | 8/2013 | Chacko | |
| 2014/0019415 A1 | 1/2014 | Barker et al. | |
| 2014/0053280 A1 | 2/2014 | Durazzo et al. | |
| 2014/0101668 A1 | 4/2014 | Gedik et al. | |
| 2014/0201111 A1 | 7/2014 | Kasravi et al. | |
| 2014/0201845 A1 | 7/2014 | Anantharam et al. | |
| 2014/0201846 A1 | 7/2014 | Anantharam | |
| 2014/0259140 A1* | 9/2014 | Subramanian ......... | H04L 63/02 726/11 |
| 2014/0280488 A1 | 9/2014 | Voit et al. | |
| 2014/0280895 A1 | 9/2014 | Branson et al. | |
| 2015/0046600 A1 | 2/2015 | Kim | |
| 2015/0309813 A1* | 10/2015 | Patel ......................... | G06F 8/75 703/22 |
| 2016/0098455 A1 | 4/2016 | Curtin et al. | |
| 2016/0344784 A1 | 11/2016 | Cao et al. | |
| 2016/0352603 A1 | 12/2016 | VanAntwerp et al. | |

OTHER PUBLICATIONS

Ambrust et al., "A View of Cloud Computing", Communications of the ACM, vol. 53, No. 4, p. 50-58, Apr. 2010.

Kandukuri et al, "Cloud Security Issues", 2009 IEEE Int'l Conf. on Services Computing, p. 517-520, 2009.

Buyya et al., "InterCloud: Utility-Oriented Federation of Cloud Computing Environments for Scaling of Application Services", Proceedings of the 10th Int'l Conf. on Algorithms and Architectures for Paralell Processing, vol. Part 1, p. 13-31, 2010.

Barsness et al., "Moving a Portion of a Streaming Application to a Public Cloud Based on Sensitive Data" U.S. Appl. No. 14/850,236, filed Sep. 10, 2015.

Barsness et al., "Moving a Portion of a Streaming Application to a Public Cloud Based on Sensitive Data" U.S. Appl. No. 14/832,570, filed Aug. 21, 2015.

Barsness et al., "Moving a Portion of a Streaming Application to a Public Cloud Based on Sensitive Data" U.S. Appl. No. 14/841,320, filed Aug. 31, 2015.

Appendix A—List of IBM Patents or Patent Applications Treated as Related.

Kwon et al., "Fault-tolerant Stream Processing using a Distributed, Replicated File System," PVLDB—Aug. 8, 2008.

Biem et al. "IBM InfoSphere Streams for Scalable, Real-Time, Intelligent Transportation Services." Proceedings of the 2010 ACM SIGMOD International Conference on Management of data, 2010.

Barsness et al., "Moving a Portion of a Streaming Application to a Public Cloud Based on Sensitive Data" U.S. Appl. No. 15/458,544, filed Mar. 14, 2017.

Appendix A—List of IBM Patents or Patent Applications Treated as Related, dated Apr. 17, 2017.

Schor et al., "Scenario-Based Design Flow for Mapping Streaming Applications onto on-Chip Many-Core Systems", Proceedings of the 2012 International Conference on Compilers, Architectures and Synthesis for Embedded Systems, ACM, 2012.

Barsness et al., "Moving a Portion of a Streaming Application to a Public Cloud Based on Sensitive Data" U.S. Appl. No. 15/813,994, filed Nov. 15, 2017.

Barsness et al., "Moving a Portion of a Streaming Application to a Public Cloud Based on Sensitive Data" U.S. Appl. No. 14/815,701, filed Nov. 16, 2017.

Barsness et al., "Moving a Portion of a Streaming Application to a Public Cloud Based on Sensitive Data" U.S. Appl. No. 15/877,942, filed Feb. 2, 2018.

IBM, Appendix A—List of IBM Patents or Patent Applications Treated as Related, dated Mar. 2, 2018.

\* cited by examiner

TupleFromE(Attr1,Attr2,Attr3,Attr4)

| Attr1 | Non-Sensitive |
| Attr2 | Non-Sensitive |
| Attr3 | Sensitive |
| Attr4 | Sensitive |

MOVING A PORTION OF A STREAMING APPLICATION TO A PUBLIC CLOUD BASED ON SENSITIVE DATA

BACKGROUND

1. Technical Field

This disclosure generally relates to streaming applications, and more specifically relates to moving a portion of a streaming application to a public cloud based on sensitive data.

2. Background Art

Streaming applications are known in the art, and typically include multiple processing elements coupled together in a flow graph that process streaming data in near real-time. A processing element typically takes in streaming data in the form of data tuples, operates on the data tuples in some fashion, and outputs the processed data tuples to the next processing element. Streaming applications are becoming more common due to the high performance that can be achieved from near real-time processing of streaming data.

Many streaming applications require significant computer resources, such as processors and memory, to provide the desired near real-time processing of data. However, the workload of a streaming application can vary greatly over time. Allocating on a permanent basis computer resources to a streaming application that would assure the streaming application would always function as desired (i.e., during peak demand) would mean many of those resources would sit idle when the streaming application is processing a workload significantly less than its maximum. Furthermore, what constitutes peak demand at one point in time can be exceeded as the usage of the streaming application increases. For a dedicated system that runs a streaming application, an increase in demand may require a corresponding increase in hardware resources to meet that demand.

BRIEF SUMMARY

A streams manager determines which portions of a streaming application process sensitive data, and when performance of the streaming application needs to be increased, selects based on the sensitive data which portion(s) of the streaming application can be moved to a public cloud. The streams manager then interacts with the public cloud manager to move the selected portion(s) of the streaming application to the public cloud. This may include cloning of processing elements or operators to a public cloud, then splitting tuple attributes so tuple attributes that do not include sensitive data can be processed in the public cloud while tuple attributes that include sensitive data are processed in a secure system. The tuple attributes are then recombined into full tuples in the secure system. The streams manager thus protects the integrity of sensitive data while still taking advantage of the additional resources available in a public cloud.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

Figure 9:
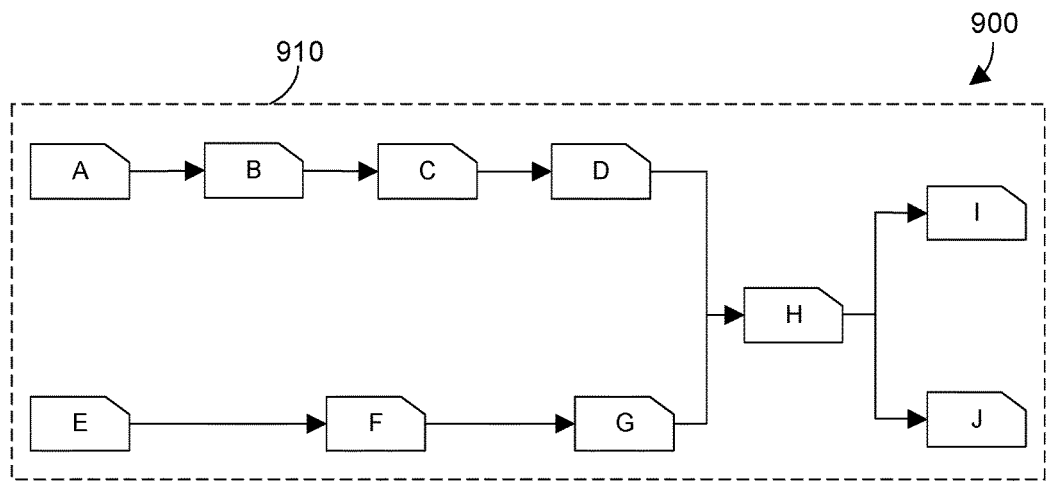
FIG. 9 is a block diagram showing a specific example of a flow graph corresponding to a streaming application.
Figures 14, 15, 16:
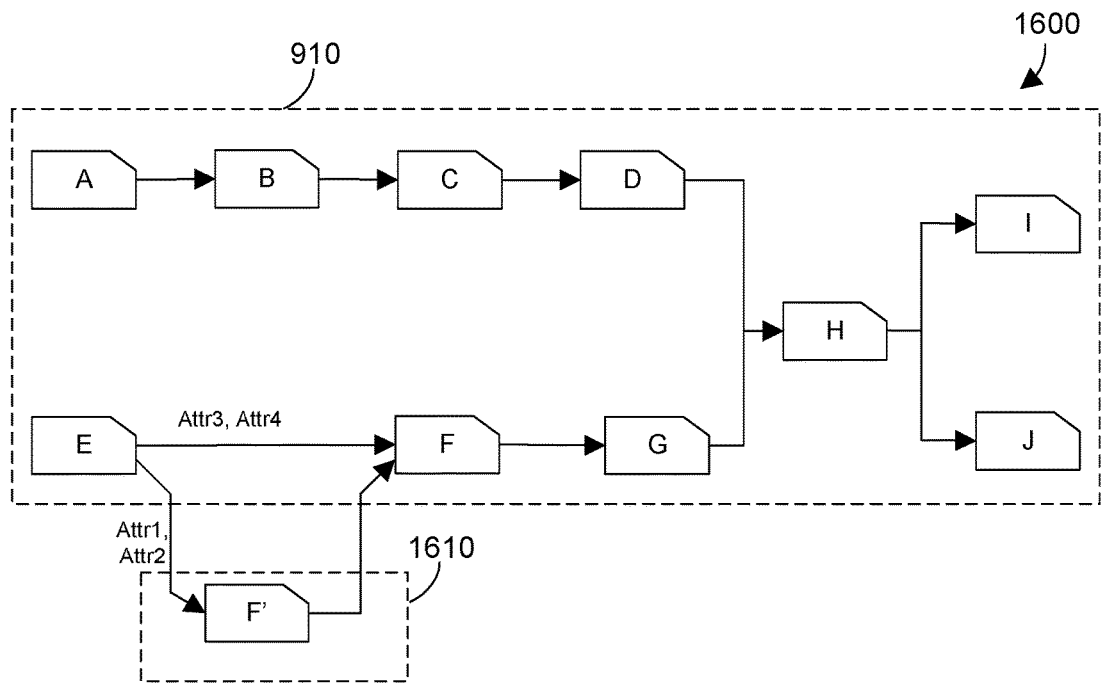
FIG. 14 shows a sample tuple comprised of four attributes.
FIG. 15 is a table showing whether the attributes in the tuple in FIG. 14 include sensitive data or not.
Figure 17:
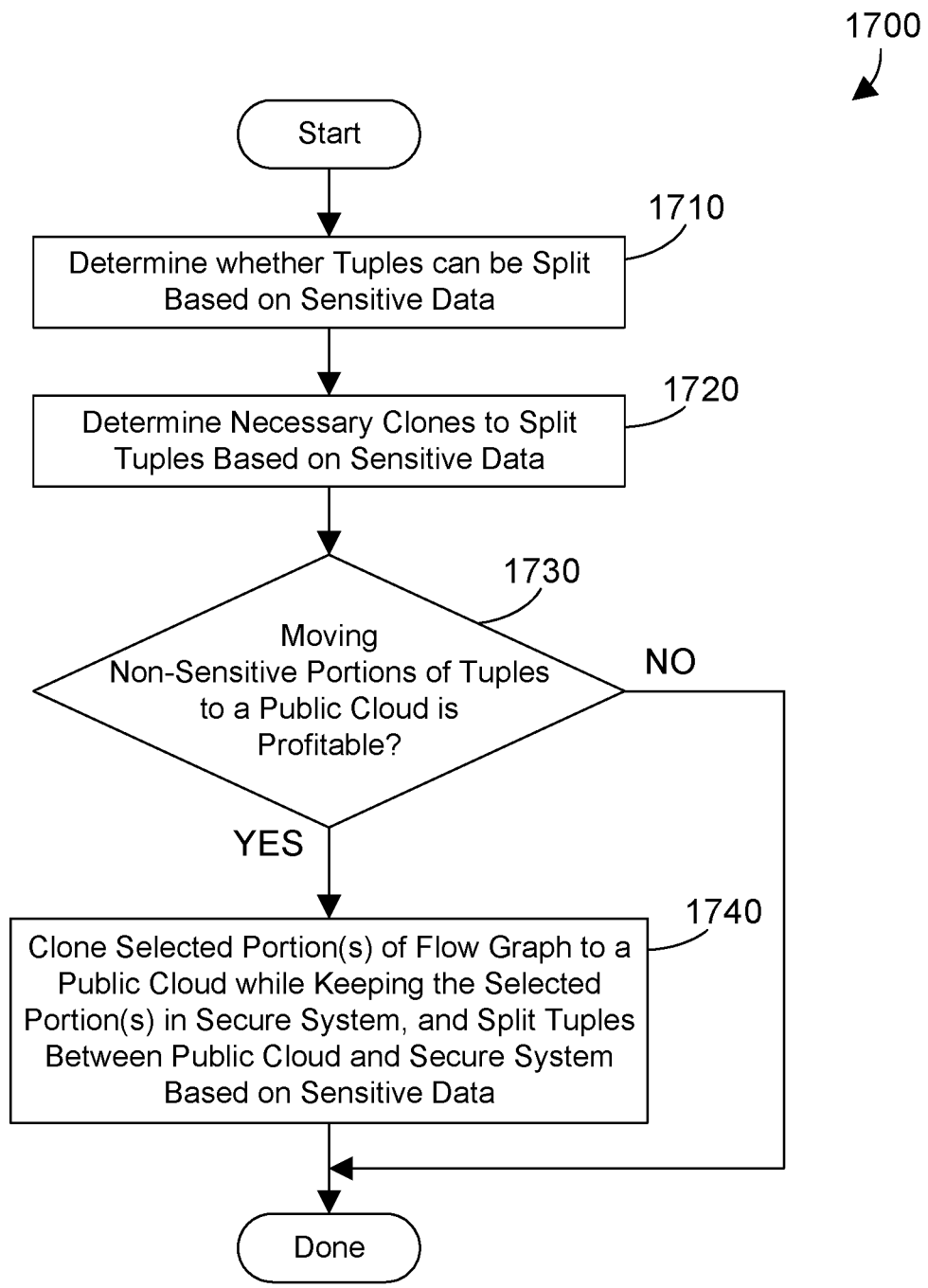

FIG. 16 is a block diagram showing a fifth example of how a portion of the flow graph in FIG. 9 can be moved to a public cloud based on sensitive data by splitting attributes of a tuple based on sensitive data; and FIG. 17 is a flow diagram of a method for a streams manager to move a portion of a flow graph to a public cloud by splitting tuples and cloning one or more processing elements to a public cloud.

DETAILED DESCRIPTION

The disclosure and claims herein relate to a streams manager that determines which portions of a streaming application process sensitive data, and when performance of the streaming application needs to be increased, selects based on the sensitive data which portion(s) of the streaming application can be moved to a public cloud. The streams manager then interacts with the public cloud manager to move the selected portion(s) of the streaming application to the public cloud. This may include cloning of processing elements or operators to a public cloud, then splitting tuple attributes so tuple attributes that do not include sensitive data can be processed in the public cloud while tuple attributes that include sensitive data are processed in a secure system. The tuple attributes are then recombined into full tuples in the secure system. The streams manager thus protects the integrity of sensitive data while still taking advantage of the additional resources available in a public cloud.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 1:
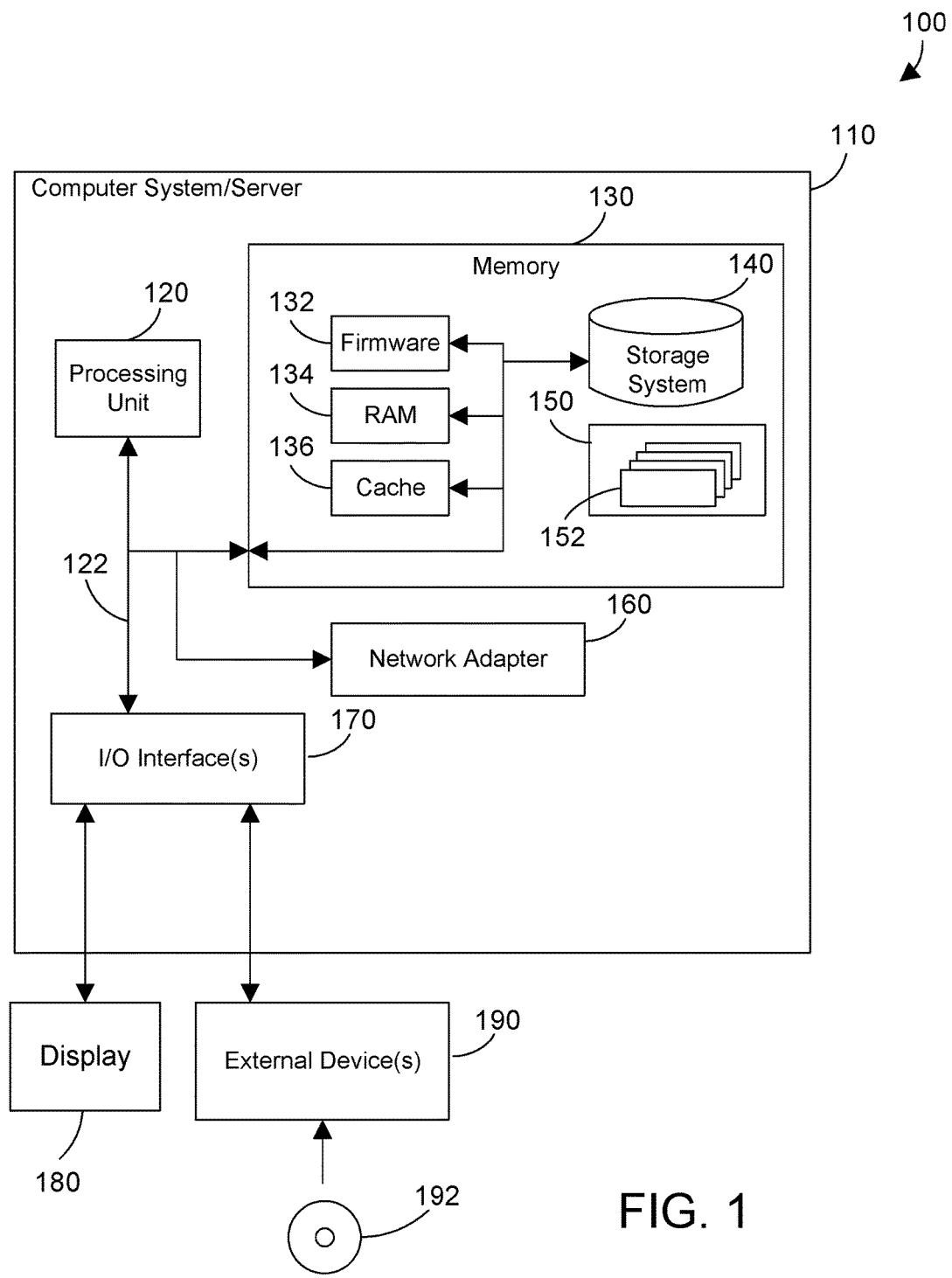
FIG. 1 is a block diagram of a cloud computing node.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processor 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media.

System memory 130 can include computer system readable media in the form of volatile, such as random access memory (RAM) 134, and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, RAID systems, tape drives, data archival storage systems, etc.

Figure 2:
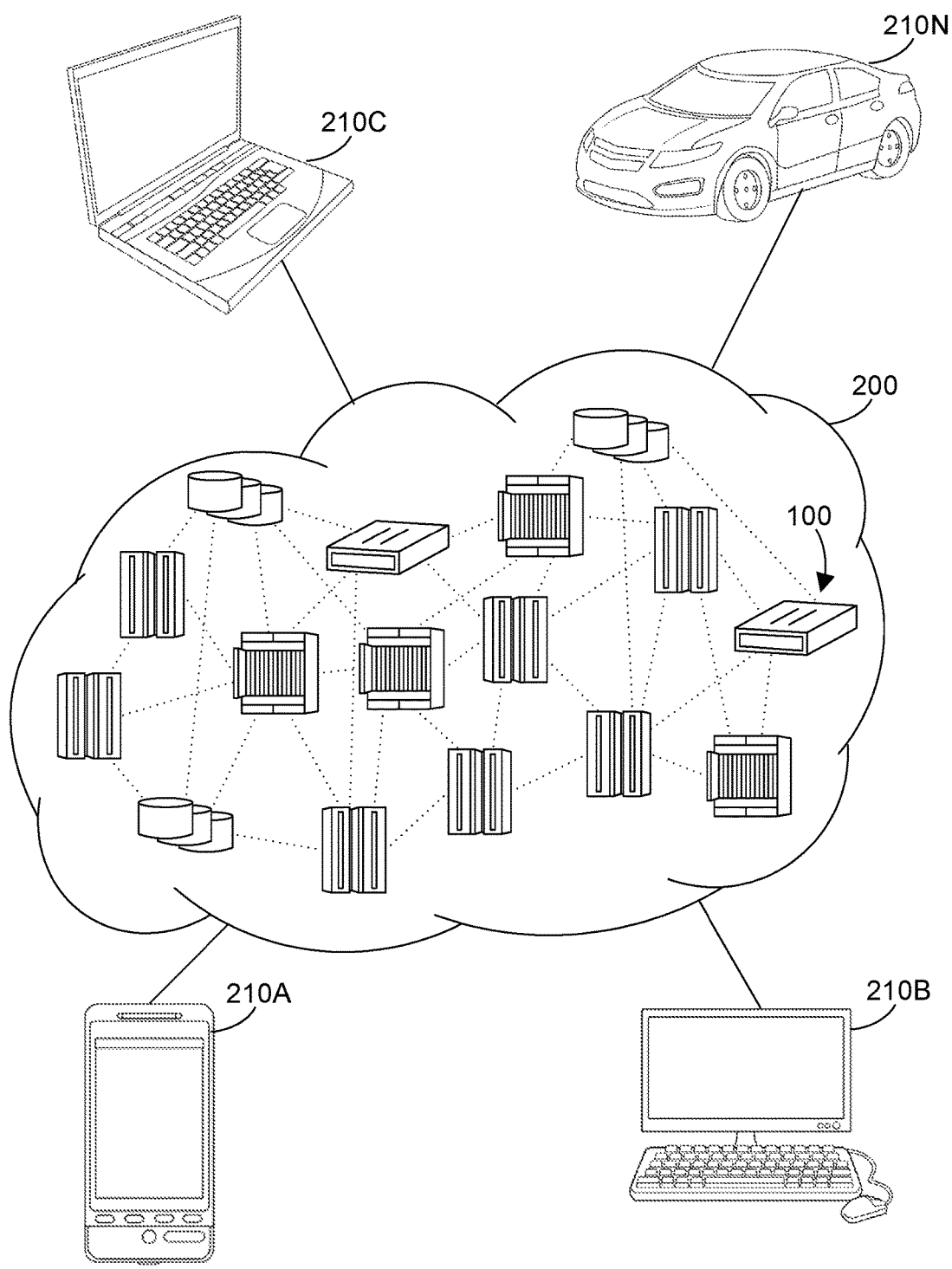
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
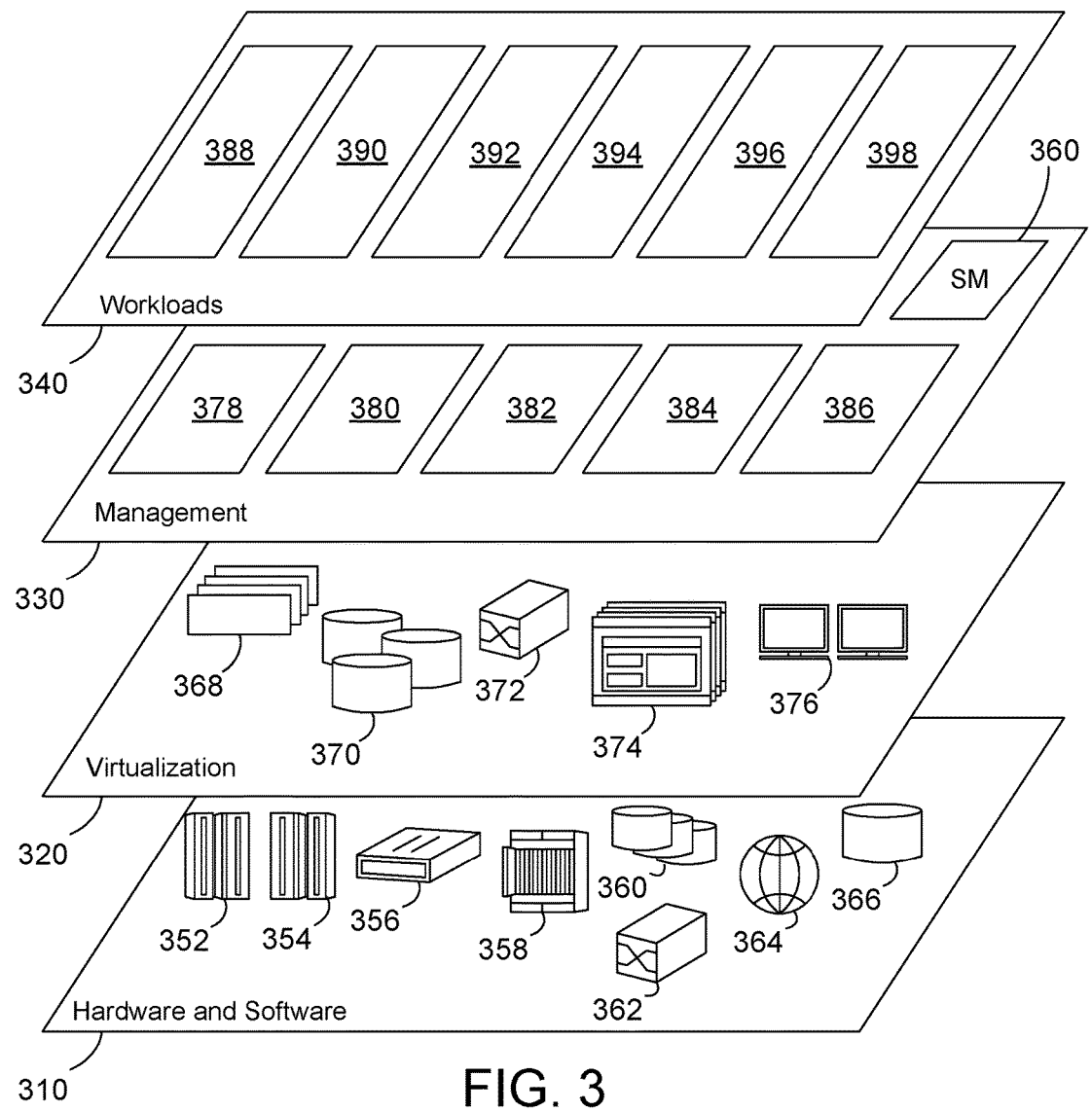
FIG. 3 is a block diagram of abstraction model layers.

Referring now to FIG. 3, a set of functional abstraction layers provided by cloud computing environment 200 (FIG. 2) is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes 352; RISC (Reduced Instruction Set Computer) architecture based servers 354; servers 356; blade servers 358; storage devices 360; and networks and networking components 362. In some embodiments, software components include network application server software 364 and database software 366.

Virtualization layer 320 provides an abstraction layer from which the following examples of virtual entities may be provided: virtual servers 368; virtual storage 370; virtual networks 372, including virtual private networks; virtual applications and operating systems 374; and virtual clients 376.

In one example, management layer 330 may provide the functions described below. Resource provisioning 378 provides dynamic procurement of computing resources and other resources that are utilized to perform tasks within the cloud computing environment. Metering and Pricing 380 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 382 provides access to the cloud computing environment for consumers and system administrators. Service level management 384 provides cloud computing resource allocation and management such that required service levels are met. Service Level Agreement (SLA) planning and fulfillment 386 provide pre-arrangement for, and procurement of, cloud computing resources for which a future requirement is anticipated in accordance with an SLA. The management layer further includes a streams manager (SM) 360 as described herein. While the streams manager 360 is shown in FIG. 3 to reside in the management layer 330, the streams manager 360 actually may span other levels shown in FIG. 3 as needed.

Workloads layer 340 provides examples of functionality for which the cloud computing environment may be utilized. Examples of workloads and functions which may be provided from this layer include: mapping and navigation 386; software development and lifecycle management 390; virtual classroom education delivery 392; data analytics processing 394; transaction processing 396 and mobile desktop 398.

As will be appreciated by one skilled in the art, aspects of this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 4:
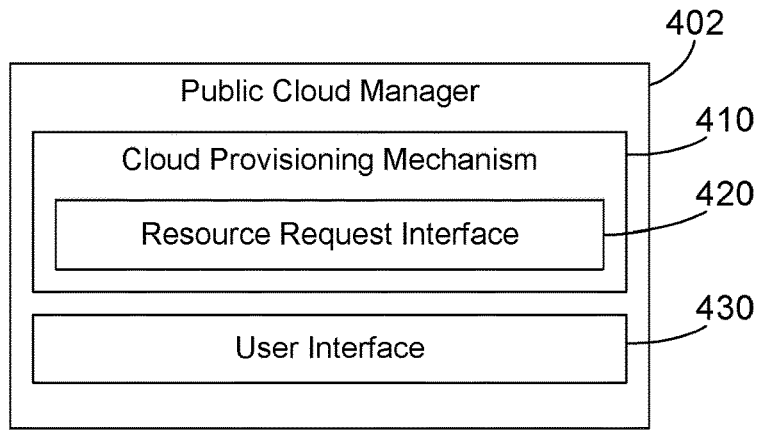
FIG. 4 is a block diagram showing some features of a public cloud manager.

FIG. 4 shows one suitable example of a public cloud manager 402. The public cloud manager 402 could reside in the management layer 330 shown in FIG. 3, or could span multiple levels shown in FIG. 3. The public cloud manager 402 includes a cloud provisioning mechanism 410 that includes a resource request interface 420. The resource request interface 420 allows a software entity, such as the streams manager 360, to request virtual machines from the public cloud manager 402 without human intervention. The public cloud manager 402 also includes a user interface 430 that allows a user to interact with the public cloud manager to perform any suitable function, including provisioning of VMs, destruction of VMs, performance analysis of the cloud, etc. The difference between the resource request interface 420 and the user interface 430 is a user must manually use the user interface 430 to perform functions specified by the user, while the resource request interface 420 may be used by a software entity to request provisioning of cloud resources by the public cloud manager 402 without input from a human user. Of course, public cloud manager 402 could include many other features and functions known in the art that are not shown in FIG. 4.

Figure 5:
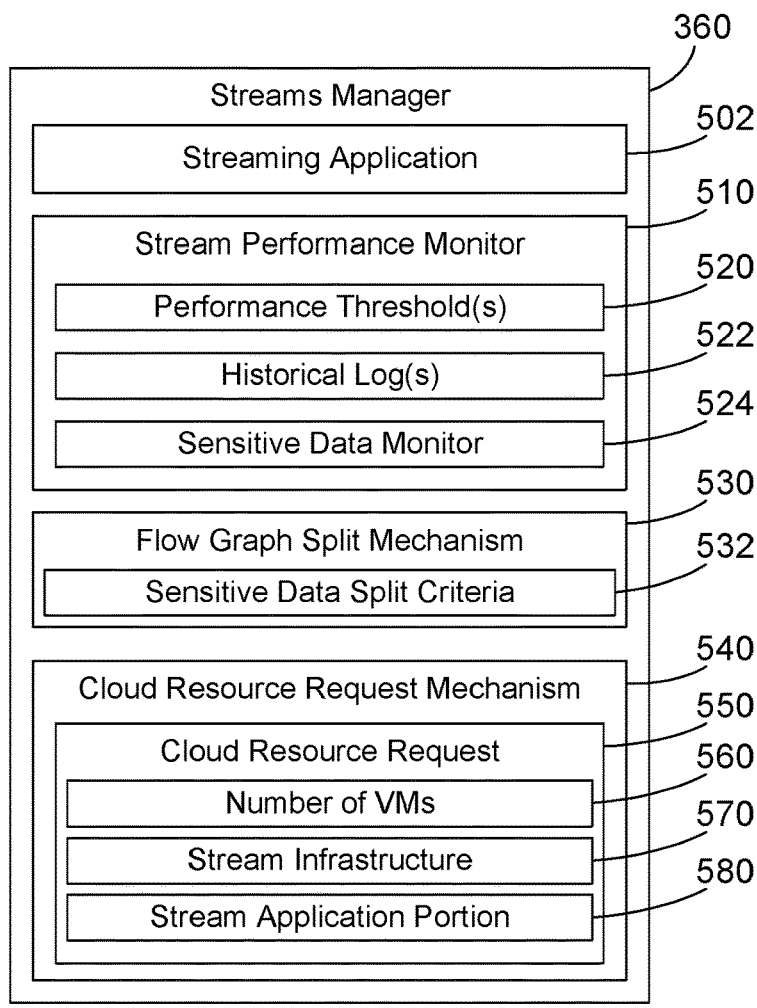
FIG. 5 is block diagram showing features of a streams manager that can move a portion of a streaming application to a public cloud taking sensitive data into account.

FIG. 5 shows one suitable example of the streams manager 360 shown in FIG. 3. The streams manager 360 is software that manages one or more streaming applications 502, including creating operators and data flow connections between operators in a flow graph that represents a streaming application 502. The streams manager 360 includes a performance monitor 510 with one or more performance thresholds 520. Performance thresholds 520 can include static thresholds, such as percentage used of current capacity, and can also include any suitable heuristic for measuring performance of a streaming application as a whole or for measuring performance of one or more operators or processing elements in a streaming application. Performance thresholds 520 may include different thresholds and metrics at the operator level, at the level of a group of operators, at the level of processing elements that include multiple operators, and/or at the level of the overall performance of the streaming application. Performance of a streaming application may also be measured by comparing current performance to past performance in one or more historical logs 522. Note the performance measured can include performance for a single operator, performance for a group of operators, performance for processing elements that include multiple operators, and performance for the streaming application as a whole.

The stream performance monitor 510 also includes a sensitive data monitor 524 that monitors the streaming application 502 and determines which portions of the streaming application 502 process sensitive data and which do not. The term "sensitive data" can include any type of data that needs to be protected based on any suitable criteria. Examples of different categories of sensitive data include: financial data; personal data; company data; employee data; trade secrets; customer data; confidential information; medical data, etc. Any type of data that might need to be protected could fall within the scope of "sensitive data" as described herein. In addition, a user could specify which data is sensitive data by either manually identifying sensitive data or by employing text analytics over the data to scan the data for string fields that may look like sensitive data or match a pattern that indicates is may be sensitive data.

The stream performance monitor 510 monitors performance of a streaming application, and when current performance compared to the one or more performance thresholds 520 or one or more historical logs 522 indicates current performance needs to be improved, the streams manager 360 then determines how to split the flow graph based on sensitive data and how to deploy a portion of the flow graph to one or more VMs in a public cloud. This is done using the flow graph split mechanism 530, which operates according to one or more sensitive data split criteria 532 that specifies one or more criterion for determining how to split a flow graph based on sensitive data. The flow graph split mechanism 530 determines how to split the flow graph into multiple portions based on which portions process sensitive data according to the sensitive data monitor 524. One or more portions of the flow graph can then be deployed to a virtual machine in a public cloud. Once the portion(s) to be deployed to a virtual machine in a public cloud are selected, the streams manager 360 communicates the need for resources to the cloud resource request mechanism 540. The cloud resource request mechanism 540, in response to the communication from the stream performance monitor, assembles a cloud resource request 550, which can include information such as a number of VMs to provision 560, stream infrastructure needed in each VM 570, and a stream application portion 580 for each VM. Once the cloud resource request 550 is formulated, the streams manager 360 submits the cloud resource request 550 to a public cloud manager, such as public cloud manager 402 shown in FIG. 4.

The cloud resource request can be formatted in any suitable way. A simple example will illustrate two suitable ways for formatting a cloud resource request. Let's assume the streams manager determines it needs two VMs, where both have common stream infrastructure, with a first of the VMs hosting operator A and the second of the VMs hosting operator B. The cloud resource request 550 in FIG. 5 could specify two VMs at 560, could specify the common stream infrastructure, such as an operating system and middleware, at 570, and could specify operator A and operator B at 580. In response, the cloud manager would provision two VMs with the common stream infrastructure, with the first of the VMs hosting operator A and the second of the VMs hosting operator B. In the alternative, the cloud resource request 550 could be formulated such that each VM is specified with its corresponding stream infrastructure and stream application portion. In this configuration, the cloud resource request would specify a first VM with the common stream infrastructure and operator A, and a second VM with the common stream infrastructure and operator B. Of course, multiple operators could also be deployed to a single VM.

Figure 6:
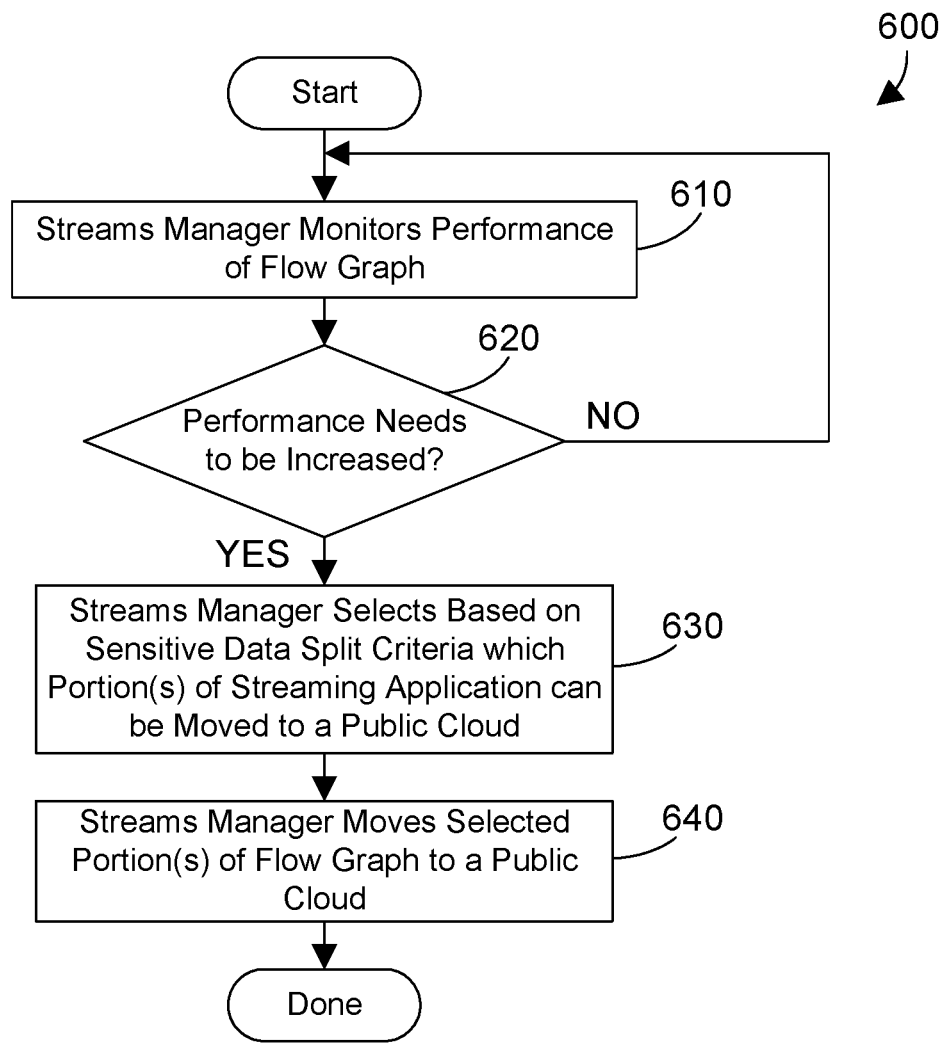
FIG. 6 is a flow diagram of a method for the streams manager to move a portion of a streaming application to a public cloud based on sensitive data.

Referring to FIG. 6, a method 600 shows one suitable example for enhancing performance of a streaming application, and is preferably performed by the streams manager 360 interacting with the public cloud manager 402. The streams manager monitors performance of the flow graph (step 610). When performance does not need to be increased (step 620=NO), method 600 loops back to step 610 and continues. When performance needs to be increased (step 620=YES), the streams manager selects based on sensitive data split criteria which portions(s) of the streaming application can be moved to a public cloud (step 630). The streams manager then moves one or more of the selected portion(s) to a public cloud (step 640). Method 600 is then done. Method 600 allows a streams manager to make intelligent decisions regarding how to split a flow graph based on sensitive data so one or more of the portions may be deployed to a virtual machine in a public cloud without compromising sensitive data.

Figure 7:
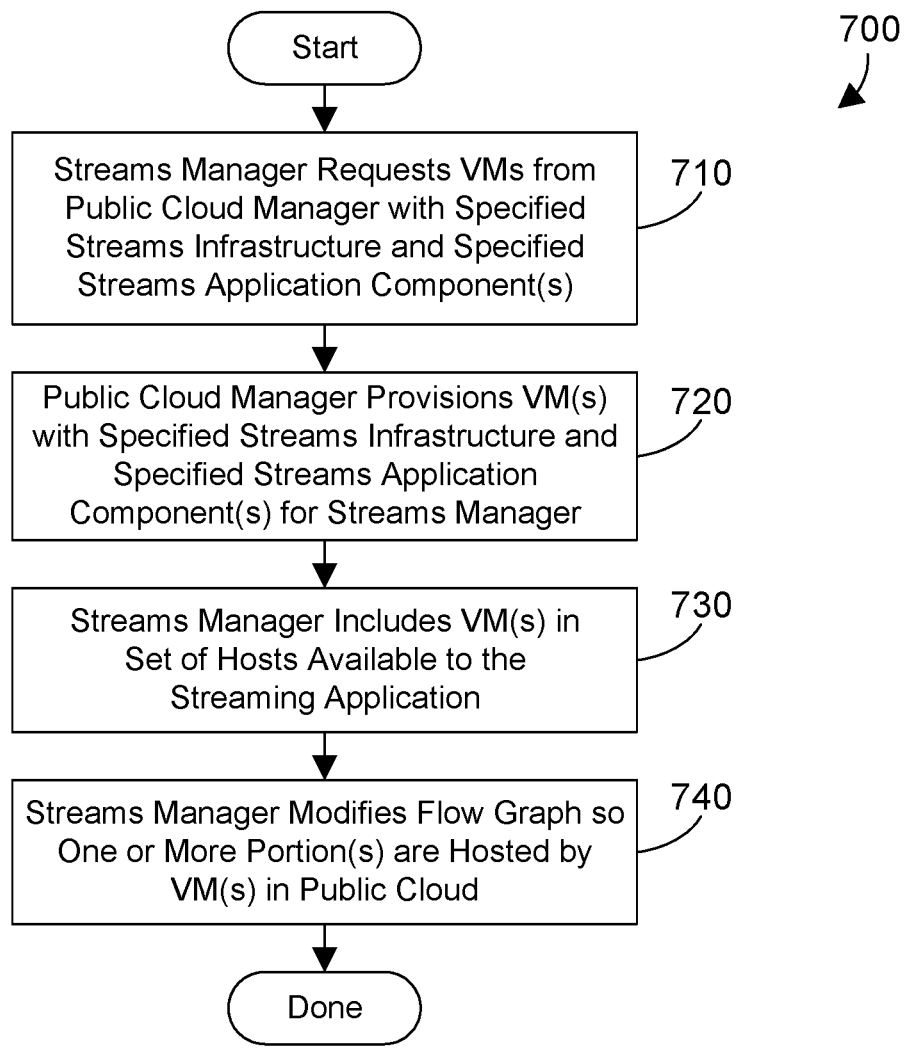
FIG. 7 is a flow diagram of a method for a streams manager to interact with a public cloud manager to move selected portion(s) of a streaming application to a public cloud.

Referring to FIG. 7, a method 700 shows one suitable example for enhancing performance of a streaming application, and is preferably performed by the streams manager 360 interacting with the public cloud manager 402. Method 700 is one suitable implementation for step 640 in FIG. 6. The streams manager requests resources, such as VMs, from the cloud manager with specified streams infrastructure and specified streams application components (step 710). The public cloud manager provisions the VMs with the specified streams infrastructure and specified streams application component(s) for the streams manager (step 720). The streams manager includes the VM(s) in the set of hosts available to the streaming application (step 630). The streams manager then modifies the flow graph so one or more portions are hosted by one or more VMs in the public cloud (step 740).

Figure 8:
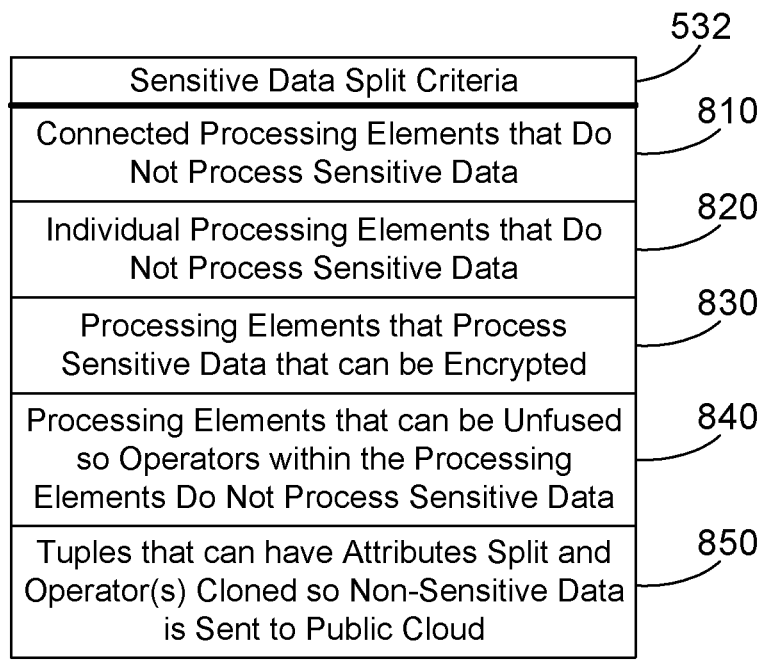
FIG. 8 is a block diagram of a table showing examples of sensitive data split criteria.

FIG. 8 shows a table that includes some examples of sensitive data split criteria 532 shown in FIG. 5. Connected processing elements that do not process sensitive data is shown at 810. This means multiple operators or multiple processing elements that each includes one or more operators that are connected and do not process sensitive data are candidates to be moved to a public cloud. Individual processing elements that do not process sensitive data is shown at 820. With this criteria 820, individual operators or processing elements could be moved to a public cloud even when they are not connected to other operators or processing elements. Processing elements that process sensitive data that can be encrypted is shown at 830. Because encrypting and decrypting data necessarily comes at a cost due to the time needed to encrypt and decrypt the data, this cost can be balanced and traded off for the benefit of being able to move some of the operators or processing elements to a public cloud. For example, in a large streaming application, it may be possible to offload hundreds or even thousands of connected operators or processing elements to a public cloud by simply encrypting once when the data goes to the public cloud and decrypting once when the processed data returns from the public cloud. In this scenario, the benefit of offloading such a large portion of the streaming application to the public cloud may significantly outweigh the additional overhead of the encryption and decryption. Processing elements that can be unfused so operators within the processing elements do not process sensitive data is shown at 840. This means it is possible to unfuse processing elements comprised of multiple operators, then move just those operators that do not process sensitive data to a public cloud. Tuples that can have attributes split and operator(s) cloned so non-sensitive data is sent to a public cloud is shown at 850. This means that a tuple's attributes may be split between attributes that include sensitive data and attributes that do not include sensitive data, with the attributes that include sensitive data being processed by operators or processing elements in a secure system, while the attributes that do not include sensitive data can be processed by cloned operators or cloned processing elements in a public cloud. Examples of these five sensitive data split criteria 810, 820, 830, 840 and 850 are discussed below.

A very simple flow graph is shown at 900 in FIG. 9 for the purpose of illustrating the concepts herein. A streaming application 900 includes processing elements A, B, C, D, E, F, G, H, I and J as shown. Processing element A originates a stream of tuples, which is processed by processing element B, which outputs tuples. The tuples from processing element B are processed by processing element C, which outputs tuples to processing element D, which processes the tuples and outputs its tuples to processing element H. In similar fashion, processing element E originates a stream of tuples, which is processed by processing element F, which outputs tuples that are processed by processing element G, which outputs tuples to processing element H. Note that processing element H receives tuples from both processing element D and processing element G. Processing element H processes the tuples it receives from processing element D and from processing element G, and outputs its tuples to processing elements I and J. We assume for this example the streaming application 900 initially runs on a dedicated system 910, such as a computer system/server 100 shown in FIG. 1. Dedicated system 910 is an example of a secure system, which denotes a system not in a public cloud that can process sensitive data.

For this specific example, the stream performance monitor 510 in FIG. 5 monitors performance of the streaming application 900 in FIG. 9 in accordance with one or more defined performance thresholds 520. An example of a suitable performance threshold 520 is percent of capacity used. A performance threshold of say, 80% could be specified for the streaming application 900 as a whole. Note a performance threshold can apply to a specified operator, to a specified a group of operators, to a specified processing element that includes one or more operators, or to all operators in the streaming application. We assume the streaming application 900 runs at less than 80% resource usage, but due to increased demand, the performance of streaming application 900 grows to exceed 80% resource usage. In response to the performance of the streaming application 900 exceeding the 80% defined performance threshold, the streams manager requests cloud resources to relieve the load on streaming application 900. How this is done depends on the sensitive data split criteria, as shown in the four specific examples in FIGS. 10-13 and discussed in detail below.

Figure 10:
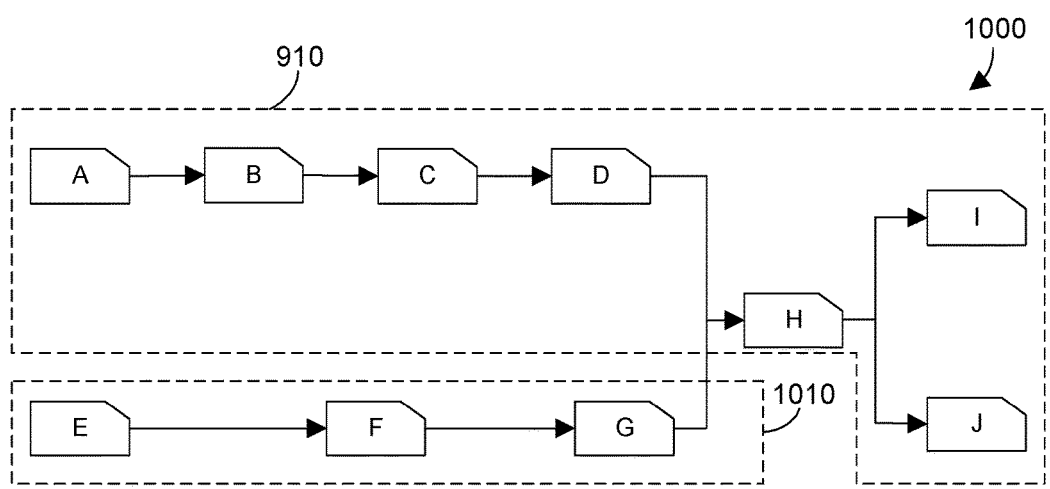
FIG. 10 is a block diagram showing a first example of how a portion of the flow graph in FIG. 9 can be moved to a public cloud based on sensitive data.

A first example in FIG. 10 applies the sensitive data split criteria 810 in FIG. 8 that specifies that connected processing elements that do not process sensitive data can be split and moved to a public cloud. We assume for the example in FIG. 10 that processing elements E, F and G do not process sensitive data. As a result, the streaming application 1000 in FIG. 10 is shown split between the portion hosted on the dedicated system 910, and the portion 1010 that has been moved to a public cloud based on the sensitive data split criteria 810.

Figure 11:
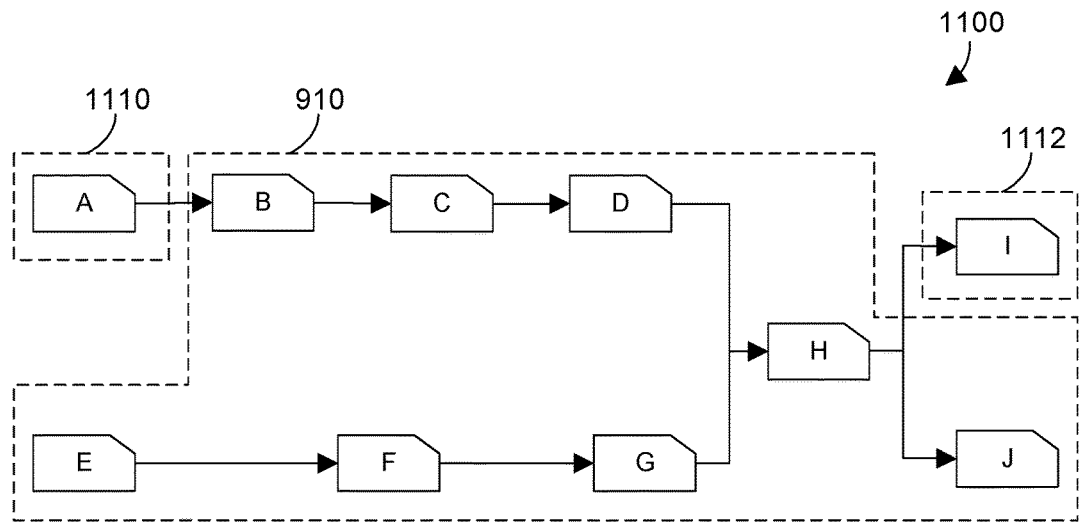
FIG. 11 is a block diagram showing a second example of how a portion of the flow graph in FIG. 9 can be moved to a public cloud based on sensitive data.

A second example in FIG. 11 applies the sensitive data split criteria 820 in FIG. 8 that specifies that individual processing elements that do not process sensitive data can be split and moved to a public cloud. We assume for the example in FIG. 11 that processing elements A and I do not process sensitive data. As a result, the streaming application 1100 in FIG. 11 is shown split between the portion hosted on the dedicated system 910, and the portions 1110 and 1112 that have been moved to a public cloud based on the sensitive data split criteria 820.

Figure 12:
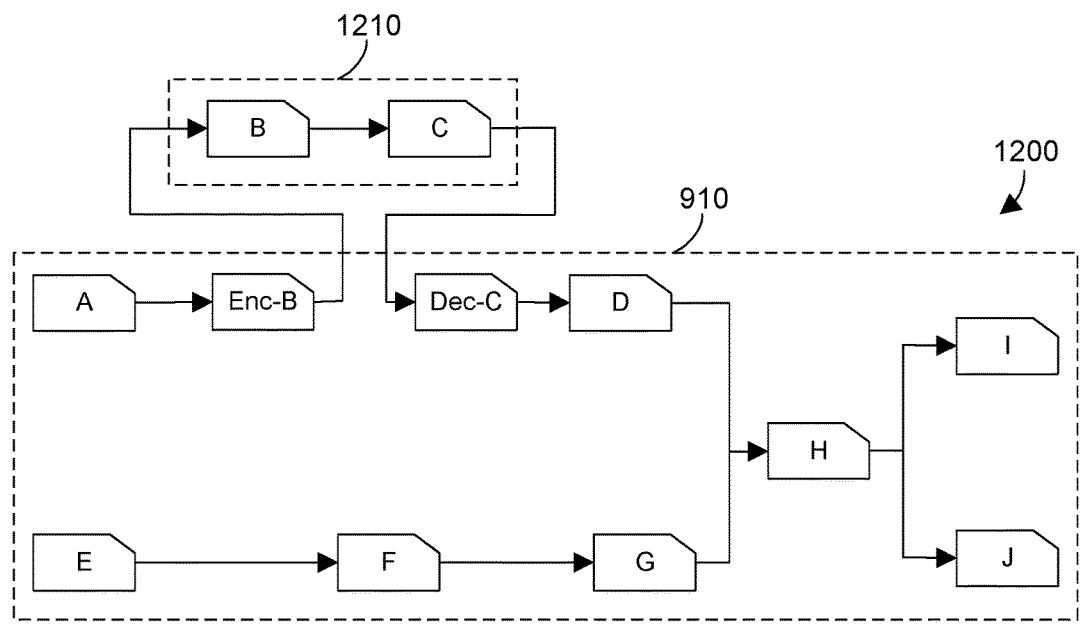
FIG. 12 is a block diagram showing a third example of how a portion of the flow graph in FIG. 9 can be moved to a public cloud based on sensitive data.

A third example in FIG. 12 applies the sensitive data split criteria 830 in FIG. 8 that specifies that processing elements that process sensitive data can be encrypted and moved to a public cloud. We assume for the example in FIG. 12 that processing elements B and C process sensitive data, but could be moved to a public cloud by encrypting the data sent to processing element B and decrypting the data coming from processing element C. Note this requires adding additional encryption and decryption processing elements in the dedicated system 910, shown in FIG. 12 as Enc-B and Dec-C. As a result, the streaming application 1200 in FIG. 12 is shown split between the portion hosted on the dedicated system 910, and the portion 1210 that has been moved to a public cloud based on the sensitive data split criteria 830.

Figure 13:
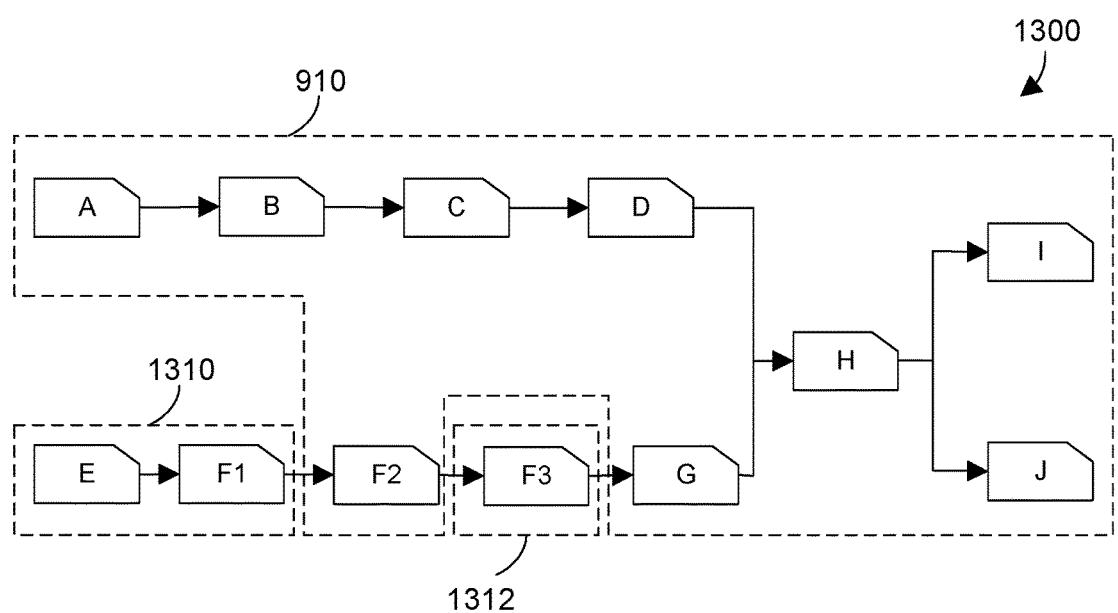
FIG. 13 is a block diagram showing a fourth example of how a portion of the flow graph in FIG. 9 can be moved to a public cloud based on sensitive data.

A fourth example in FIG. 13 applies the sensitive data split criteria 840 in FIG. 8 that specifies that processing elements that can be unfused so operators within the processing elements that do not process sensitive data can be encrypted and moved to a public cloud. We assume for the example in FIG. 13 that processing element F includes three operators, F1, F2 and F3. By unfusing the processing element F into its three separate operators F1, F2 and F3, one or more of the unfused operators that do not process sensitive data may be moved to the public cloud even when one or more of the unfused operators process sensitive data. We assume for this example in FIG. 13 that operators F1 and F3 do not process sensitive data, but operator F2 does process sensitive data. We further assume that processing element E does not process sensitive data. As a result, after unfusing processing element F into its constituent operators F1, F2 and F3, processing element E and operator F1 can be moved to a public cloud, and operator F3 can be moved to a public cloud, while operator F2, which processes sensitive data, remains in the dedicated system 910. As a result, the streaming application 1300 in FIG. 13 is shown split between the portion hosted on the dedicated system 910, and the portions 1310 and 1312 that have been moved to a public cloud based on the sensitive data split criteria 840.

In addition to unfusing processing elements, tuples may be split into constituent parts that can then be processed separately according to whether or not they include sensitive data. This example of sensitive data split criteria is shown at 850 in FIG. 8. Referring to FIG. 14, a tuple TupleFromE represents a tuple sent from processing element E to processing element F in FIG. 9. We assume for this simple example that the attributes Attr1 and Attr2 do not include sensitive data, and the attributes Attr3 and Attr4 include sensitive data, as shown in the table in FIG. 15. For example, Attr3 and Attr4 could contain data such as social security number and telephone number, respectively, which could be considered sensitive data. For this example, we assume processing element F processes Attr1 and Attr2, but does not process Attr3 or Attr4. With the information in FIG. 15 and knowing processing element F does not process Attr3 or Attr4, it is possible to split the tuples themselves into different sets of attributes according to whether or not the attributes contain sensitive data, with a first set of the tuple attributes including sensitive data and a second set of the tuple attributes not including sensitive data. This allows the attributes that do not include sensitive data to be processed by a cloned portion of the flow graph in a public cloud, while attributes that include sensitive data are processed by a secure system. With the tuple attributes shown in FIGS. 14 and 15 for the tuple coming from processing element E, FIG. 16 shows how the streams manager could create a cloned processing element F' in a public cloud 1610 that is a clone of processing element F while keeping the other processing elements in the dedicated system 910. Note the tuple attributes from processing element E are split, with Attr1 and Attr2 being routed to the cloned processing element F' in the public cloud 1610, while Attr3 and Attr4 are routed to the original processing element F in the dedicated system 910. Note the function of the original processing element F will be changed to receive Attr3 and Attr4 from processing element E, to receive Attr1 and Attr2 from processing element F' in the public cloud 1610, and to recombine these into a full tuple that includes all four attributes Attr1, Attr2, Attr3 and Attr4. This allows tuples themselves to be split into separate attributes that may be processed separately then recombined to benefit from use of resources in a public cloud while protecting the integrity of sensitive data.

Referring to FIG. 17, a method 1700 is preferably performed by the streams manager 360 in FIGS. 3 and 5. Method 1700 begins by determining whether tuples can be split based on sensitive data (step 1710). Next, determine any clones that may be needed to split the tuples based on sensitive data (step 1720). A determination is then made regarding whether moving non-sensitive portions of tuples to a public cloud is profitable (step 1730). This determination may be made in any suitable way using any suitable criteria, algorithm or heuristic. The general concept in step 1730 is simple to grasp: if the benefits of splitting tuples into two different attribute sets according to sensitive data and processing some on a dedicated system and others in a public cloud, then recombining the split tuple portions to make a full tuple again, are not greater than the additional overhead, processing performance and cost of making this change, the change is not made. Notice that "profitable" can be defined in any suitable way using any suitable criteria or combination of criteria. In other words, while a streams manager may be able to split tuples, it doesn't necessarily do so when splitting tuples into different attribute sets does not give enough of an advantage over the existing configuration. When moving the non-sensitive portions of tuples to a public cloud is not profitable (step 1730=NO), method 1700 is done. When moving the non-sensitive portions of tuples to a public cloud is profitable (step 1730=YES), the streams manager clones one or more selected portion(s) of the flow graph to a public cloud while keeping the selected portion(s) in the secure system, and splits the tuples between the public cloud and secure system based on sensitive data (step 1740). Method 1700 is then done. Method 1700 illustrates steps the streams manager could take to start with the flow graph 900 in FIG. 9 and end up with the flow graph 1600 in FIG. 16.

The specific sensitive data split criteria 810, 820, 830, 840 and 850 are shown by way of example, and are not limiting of the disclosure and claims herein, which apply to any and all criteria that could be developed for determining which portions of a flow graph may be split to a public cloud based on sensitive data, whether currently known or developed in the future.

The disclosure and claims herein relate to a streams manager that determines which portions of a streaming application process sensitive data, and when performance of the streaming application needs to be increased, selects based on the sensitive data which portion(s) of the streaming application can be moved to a public cloud. The streams manager then interacts with the public cloud manager to move the selected portion(s) of the streaming application to the public cloud. This may include cloning of processing elements or operators to a public cloud, then splitting tuple attributes so tuple attributes that do not include sensitive data can be processed in the public cloud while tuple attributes that include sensitive data are processed in a secure system. The tuple attributes are then recombined into full tuples in the secure system. The streams manager thus protects the integrity of sensitive data while still taking advantage of the additional resources available in a public cloud.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a streaming application residing in the memory and executed by the at least one processor, the streaming application comprising a flow graph that includes a plurality of processing elements that process a plurality of data tuples;
   a performance monitor residing in the memory and executed by the at least one processor, the performance monitor monitoring performance of the plurality of processing elements in the flow graph;

a sensitive data monitor that identifies which of the plurality of processing elements in the flow graph process sensitive data;

at least one sensitive data split criterion that specifies how to split the flow graph based on sensitive data so at least a portion of the flow graph can be moved to a public cloud in a manner that assures the sensitive data is not in the public cloud, wherein the at least one sensitive data split criterion specifies to split a plurality of tuple attributes corresponding to a selected data tuple between a first set of the plurality of tuple attributes that include sensitive data and a second set of the plurality of tuple attributes that do not include sensitive data; and a streams manager residing in the memory and executed by the at least one processor, the streams manager managing the streaming application, the streams manager selecting based on the at least one sensitive data split criterion at least one portion of the flow graph to move to the public cloud when the performance monitor determines performance of the streaming application needs to be improved, and in response, the streams manager moves the selected at least one portion of the flow graph to the public cloud by creating at least one cloned portion of the flow graph in the public cloud, routes the first set of the plurality of tuple attributes to a portion of the flow graph in a secure system, routes the second set of the plurality of tuple attributes to the at least one cloned portion of the flow graph in the public cloud, and recombines the first set of the plurality of tuple attributes and the second set of the plurality of tuple attributes into the selected tuple in the secure system.

2. The apparatus of claim 1 wherein the at least one sensitive data split criterion specifies to move to the public cloud connected processing elements in the flow graph that do not process sensitive data.

3. The apparatus of claim 1 wherein the at least one sensitive data split criterion specifies to move to the public cloud individual processing elements in the flow graph that do not process sensitive data.

4. The apparatus of claim 1 wherein the at least one sensitive data split criterion specifies to move to the public cloud connected processing elements in the flow graph that process sensitive data that can have a data input encrypted and a data output decrypted.

5. The apparatus of claim 1 wherein the at least one sensitive data split criterion specifies to unfuse one of the plurality of processing elements into a plurality of operators so at least one of the plurality of operators that does not process sensitive data is moved to the public cloud while at least one of the plurality of operators that process sensitive data is not moved to the public cloud.

6. The apparatus of claim 1 wherein the streams manager moves the selected at least one portion of the flow graph to the public cloud by requesting a public cloud manager to provision at least one virtual machine with logic to implement the selected at least one portion of the flow graph, and when the public cloud manager provisions the at least one virtual machine, the streams manager modifies the flow graph to include the at least one virtual machine in the flow graph of the streaming application.

7. The apparatus of claim 1 wherein the streams manager determines when the performance of the streaming application needs to be improved by comparing current performance of the streaming application to at least one performance threshold.

8. The apparatus of claim 1 wherein the streams manager determines when the performance of the streaming application needs to be improved by comparing current performance of the streaming application to historical performance of the streaming application.

* * * * *